July 11, 1933.  J. D. HILLIARD  1,918,036
FLUID INSULATED CONDUCTOR
Filed Aug. 14, 1929

Inventor:
John D. Hilliard,
by Charles V. Tullar
His Attorney.

Patented July 11, 1933

1,918,036

UNITED STATES PATENT OFFICE

JOHN D. HILLIARD, OF SCHENECTADY, NEW YORK, ASSIGNOR TO GENERAL ELECTRIC COMPANY, A CORPORATION OF NEW YORK

FLUID INSULATED CONDUCTOR

Application filed August 14, 1929. Serial No. 385,801.

My invention relates to insulating means for electrical conductors, and more particularly to insulating and protective structure of the metal-clad type, wherein an electrical conductor is immersed in an insulating fluid contained within a metallic conduit.

When a fluid insulating medium, as oil, is used to insulate a high tension conductor, as where a phase conductor is disposed within a conduit filled with oil, provision must be made for maintaining the conduit filled with oil at all times to insure proper insulation of the conductor notwithstanding normal "breathing" of the system; that is, the expansion and contraction of the oil due to variations in its temperature. Another condition which must at the same time be met in the use of metal-clad insulating structure of the aforesaid type is the possibility of a phase to ground arc through the oil body with resultant sudden generation of large quantities of gases due to the action of the arc on the oil. Under certain conditions, depending on the duration of the arc and other factors, the quantities of gases so generated may cause sudden internal pressures of such magnitude within the conduit that it is ruptured, thereby causing considerable loss of oil and the temporary disability of that particular phase unless practically instantaneous relief is provided.

An object of my invention is to provide a combined expansion and isolating section for a conduit for permitting "breathing", or normal expansion and contraction of the insulating fluid within the conduit due to variations in temperature thereof, while maintaining the system filled with the insulating fluid, and for reducing the loss of insulating fluid due to leakage or rupture of the conduit at one portion thereof.

A further object is the provision of automatic pressure relief means associated with an expansion chamber for permitting immediate escape of insulating fluid and gas from the conduit and expansion chamber, in the event that the internal pressure therein exceeds a predetermined value due to arcing through the insulating fluid.

My invention will be more fully set forth in the following description referring to the accompanying drawing, and the features of novelty which characterize my invention will be pointed out with particularity in the claims annexed to and forming a part of this specification.

Figure 1:
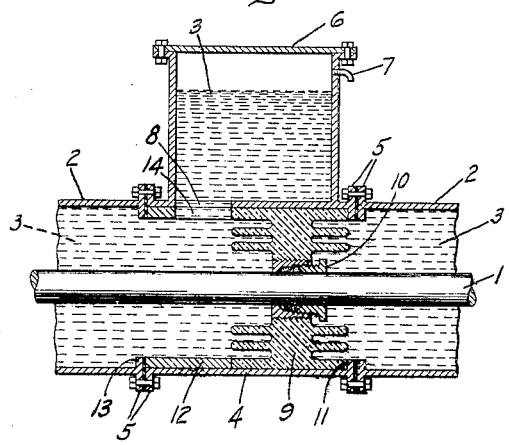
Figure 2:
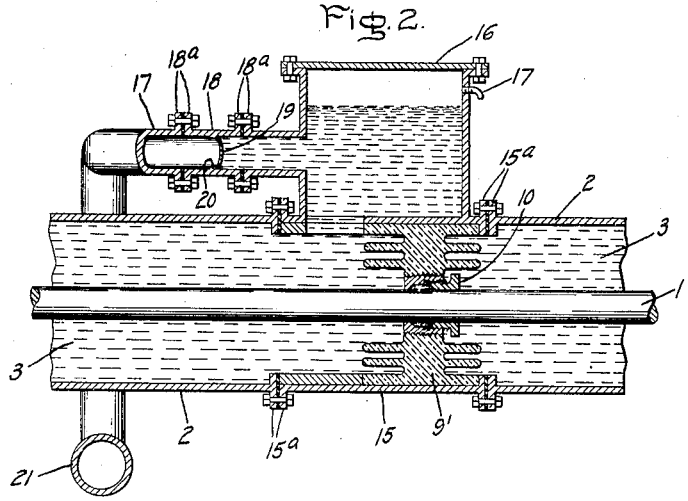

Referring to the drawing, Fig. 1 illustrates an elevational sectional view of insulating structure of the metal-clad type, and Fig. 2 is an elevational view, partly in section, of similar structure.

In Fig. 1 there is illustrated an insulating structure of the metal-clad type wherein an electrical conductor 1, which may be and usually is a phase conductor of a high tension system, is substantially concentrically disposed within a metallic conduit 2 of conducting material. In practice, the conduit 2 is usually grounded so that in case of insulation breakdown the short circuit will be from the phase conductor to ground, and so may be controlled to a certain extent, as compared with interphase short circuits.

An insulating fluid 3, as oil for example, is contained within conduit 2 and should at all times completely fill the conduit in order that the insulation around the conductor 1 may be maintained at its highest dielectric strength.

Interposed in the conduit 2 is a combination expansion and isolating section, 4, suitably secured to the conduit, as by flange couplings 5, and comprising an expansion chamber, 6, which is mounted on the upper portion of the section. The expansion chamber 6 is provided with an atmospheric vent 7 and an opening 8, communicating with the conduit for a purpose hereinafter described. Likewise mounted with respect to and internally of section 4 is an isolating insulating bushing 9 provided with a packing gland 10 for mounting and sealing the conductor 1 with respect to the insulating fluid on opposite sides of the bushing. The bushing 9 at one end abuts the annular flange 11 forming a part of section 4, and at its other end is engaged by a retaining ring 12 which in turn is maintained in position by an annular shoulder 13 forming a part of the main conduit. The bushing is accordingly restrained from axial movement. The retaining ring 12 is provided with an aperture 14 in registry with the opening 8, for permitting unobstructed flow of the insulating fluid at an appreciable rate between the expansion chamber 6 and one section of the conduit.

For the purpose of simplicity and in order to avoid unnecessary description and illustration, but a single expansion chamber is illustrated in connection with Fig. 1, it of course being understood that the section to the right of the insulating bushing may likewise be provided with a similar expansion chamber and associated structure.

When oil is used as the insulating fluid, it is necessary to take into account the comparatively large co-efficient of expansion of this liquid, since for ordinary temperature variations there is a resulting appreciable change in the volume of the oil body. Accordingly, if the main conduit 2 is to be completely filled at all times with the oil, it is necessary to compensate for its "breathing" action, i. e., the normal expansion and contraction of the liquid due to the aforesaid temperature variations, and to this end the expansion chamber 6 is provided. The normal level of the oil within chamber 6 is such that there will still be a certain amount of oil therein during the lower range of temperatures of the oil body, the oil body within the conduit while contracting being continually replenished by liquid from the chamber through openings 8 and 14. During the higher temperature ranges of the oil, the liquid level within chamber 6 rises to approximately the position illustrated in Fig. 1, so that there is no appreciable loss of oil from the system through vent 7. Accordingly, the main conduit is maintained filled with oil at atmospheric pressure at all times notwithstanding appreciable changes in volume of the insulating fluid.

In the event that large and sudden disruptive internal pressures are developed within the conduit, as for example by the sudden generation of large quantities of gases due to arcing between the conductor 1 and the grounded metallic conduit, there will be a displacement of the oil body tending to create large internal pressures, and to rupture the conduit unless in some manner relieved. The openings communicating with the expansion chamber, 6, are of such size that the oil may quickly flow under pressure into the expansion chamber, the air in the upper part of which acting as a buffer or cushioning means to partially absorb the energy of the moving liquid, thereby tending to relieve the stresses in the conduit set up by the aforesaid pressures. In such cases the atmospheric vent 7 which is restricted in size, does not permit appreciable escape of oil from the system.

The loss of oil, in case the conduit is ruptured at some point or section, is reduced to a minimum, since the loss is confined to that section by the sectionalizing bushings. The sectionalizing bushings are held in fixed position by the retaining means previously described so that internal pressures of the above described character which would tend to slide the bushings along the conductor 1 are ineffective to disturb them.

For cooperating with the structure above described and for relieving excessively large internal pressures developed within the conduit, there may be likewise interposed in the main conduit 2 additional means for preventing damage to the system due to such high internal pressures. Referring to Fig. 2, there is interposed in conduit 2 a section 15 secured to the conduit as by flanges 15a and provided with an expansion chamber 16 and an insulating bushing 9' of the character above described. Bushing 9' is retained in position and permits communication between the main conduit 2 and expansion chamber 16 by means similar to those of Fig. 1. The chamber 16 may be disposed intermediate sections of the character illustrated in Fig. 1 and has an atmospheric vent 17 functioning in a manner similar to vent 7. Communicating with chamber 16 is a discharge conduit 17 having interposed therein a section 18 within which is mounted a diaphragm 19 of the collapsible-disc type and of the character described and claimed by W. K. Rankin in a copending application, Serial No. 204,687, filed July 11, 1927, which has matured into Patent No. 1,774,946 issued Sept. 2, 1930. Section 18 may be suitably mounted as by couplings 18a, to conduit 17 in order that the section may be readily removed for inspection or replacement of parts. The diaphragm is maintained in convex relation with respect to the oil body 3 by an annular shoulder 20 forming a part of section 18. Upon increase in pressure upon the diaphragm to a predetermined extent by the oil, it collapses, that is, reverses its curvature, and so is swept through the discharge vent or conduit by the escaping oil. The discharge conduit 17 may communicate with a conduit, 21, for returning the oil to some central reservoir so that it may be used again.

The section illustrated in Fig. 2 is compact and affords more complete protection against excessively high disruptive internal pressures within the conduit than the structure illustrated in Fig. 1, since there is afforded means for permitting immediate relief by the escape of a part of the oil upon generation of large quantities of gases tending to accelerate the oil body and so create such pressures, and the discharge vent opening is of sufficient size to discharge all the gas formed under continuous arcing conditions without the pressure being raised to a dangerous point. To such an extent, the use of the structure illustrated in Fig. 2 may be auxiliary to or independent of that of Fig. 1. The expansion chamber 16 functions and permits normal "breathing" of the system in substantially the same manner as expansion chamber 6, and in addition, it has means for preventing excessive internal pressures within the main conduit which would tend to rupture the same, thereby causing loss of the oil and possible damage to adjoining equipment. Also the insulating and sectionalizing bushing, 9', serves in the same manner as in Fig. 1 to prevent drainage of the insulating fluid from unaffected parts of the system.

Accordingly, it shall be understood that the structures as illustrated in Figures 1 and 2 may comprise parts of the same system for bringing about the same results, namely, relief of disruptive internal pressures within the conduit, sectionalizing of the conduit to prevent unnecessary loss of oil from unaffected parts, and the maintenance of insulating fluid at all times within the conduit to normally fill it concurrent with the "breathing" action previously described.

What I claim as new and desire to secure by Letters Patent of the United States is:—

1. An insulating structure of the metal-clad type comprising a metallic conduit within which an electrical conductor to be insulated is disposed, an insulating fluid contained within and completely filling said conduit, a section interposed in said conduit comprising an expansion chamber for permitting normal expansion and contraction of the insulating fluid while maintaining the conduit filled therewith, a discharge conduit communicating with said expansion chamber and a diaphragm of the collapsible-disc type interposed in a section of said discharge conduit for relieving suddenly developed pressure of predetermined magnitude within the first named conduit, whereby fluid within said conduit may be expelled through said discharge conduit.

2. An insulating structure of the metal-clad type comprising a metallic conduit within which an electrical conductor to be insulated is disposed, an insulating fluid contained within and completely filling said conduit, a section interposed in said conduit comprising a vented expansion chamber in communication therewith, an insulating sectionalizing bushing mounted within said section for supporting said conductor and preventing flow of the insulating fluid past said section in either direction, and a retaining ring within said section engaging said bushing for preventing axial movement thereof, said retaining ring being provided with an aperture for permitting communication between said conduit and expansion chamber.

In witness whereof, I have hereunto set my hand this 10th day of August, 1929.

JOHN D. HILLIARD.